Sept. 19, 1961 H. S. STINSON 3,000,131
ATTACHMENT FOR FISHHOOKS
Filed Jan. 26, 1959

INVENTOR.
Harold S. Stinson

United States Patent Office 3,000,131
Patented Sept. 19, 1961

3,000,131
ATTACHMENT FOR FISHHOOKS
Harold S. Stinson, Town and Country, Mo.
(11777 Clayton Road, St. Louis 22, Mo.)
Filed Jan. 26, 1959, 788,800
2 Claims. (Cl. 43—44.6)

The invention has to do with the art of fishing and relates more particularly to an improved method of attaching bait to a fish-hook. It consists substantially of such features of construction, arrangement, and combination of parts as will hereinafter be described and distinctly claimed.

Among the objects of the invention are the following: To provide an improved method of attaching fishing-worms and bait of a similar nature to a fish-hook, obviating the necessity of threading the worm upon the fish-hook and impaling the worm with the burr of the hook; to combine in one device the principal features of two previously issued patents, being Patent No. 2,898,701, dated August 11, 1959, and Patent No. 2,900,755, dated August 25, 1959, in order to thereby produce a device that will permit one end of a fishing worm to be clamped along the upper portion of the shank of a fish-hook, the worm to be wrapped around the shank as desired, and then the other end of the worm clamped along the lower portion of the shank of the fish-hook; to provide a bait holding clamp with a bent end diverging from the upper portion of the shank of a fish-hook to provide an inwardly converging bait receiving opening along the upper portion of said shank so that the bait itself may be used as a wedge to pry apart the clamp, and using the bends of the hooks of a multiple bend fish-hook to provide an inwardly converging bait receiving opening at the lower extremity of the shanks of the fish-hook so that bait itself may be used as a wedge to pry apart the clamp along the lower portion of the shank of the fish-hook; and such other features as will become apparent to those skilled in the art.

In the drawings

Figure 1:
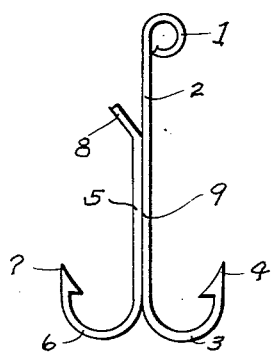
FIGURE 1 is a side elevational view of the preferred embodiment of the invention.
Figure 2:
FIGURE 2 is a front elevational view of the preferred embodiment of the invention.

The present form of the invention is shown in FIGURES 1 and 2 wherein one of fish-hooks of a multiple-fish-hook arrangement is provided with a circular loop 1 which serves as a line-attaching end. One of the extremities of said loop 1 extends to form the shank 2. The bend 3 and the burr 4 are formed at the lower extremity of the shank 2. Another fish-hook consists of a shank 5 which is connected intermediate its upper and lower extremities to the shank 2 at a point thereon designated by the numeral 9. This connection may be accomplished by brazing. It will be seen from this construction that the upper as well as the lower extremities of the shanks 2 and 5 are free to be sprung apart from point of connection 9 to their extremities. Normally both shanks 2 and 5 are in contacting engagement, thus forming an upper and a lower clamp. The upper end of the shank 5 has a bent end 8 which diverges outwardly from the shank 2 and thereby forms an inwardly converging bait receiving opening so that bait may be used as a wedge to pry apart the upper portion of the shanks 2 and 5. Formed at the lower extremity of the shank 5 is a bend 6 and a burr 7. The bends 3 and 6 are positioned in opposite directions so that in this form of the invention they are separated by an angle of 180 degrees. The curve of the bends 3 and 6 meeting as they do at the lower extremities of the shanks 2 and 5, thus form an inwardly converging bait receiving opening below the extremities of the said shanks 2 and 5.

However, it should be made clear at this point that I do not limit the invention to this specific position of the bends and burrs of the fish-hooks, as it will be readily apparent to anyone skilled in the art that as long as the burrs 4 and 7 are spaced apart a sufficient distance for the insertion of bait between them, satisfactory results can be obtained without deviating from the spirit of the invention or the scope of my claims. It is the main purpose of this disclosure to show that a bait receiving opening is provided below the extremities of the two shanks 2 and 5.

In order to provide a way to prevent the escape of bait which has already been inserted between the inner surfaces of the two shanks 2 and 5, the device in this instance is made of a narrow flat spring-like material which will provide an area of contacting engagement sufficient to obstruct the escape of bait. However, any of the well-known methods of preventing the escape of bait could be used with equal results.

In the operation of the device the bait, using a worm as bait to illustrate, one end of the worm is placed between the bent end 8 and the shank 2, allowing a generous portion of the end of the worm to extend beyond this bait receiving opening, the worm is then pulled forward and downwardly thereby causing it to act as a wedge to pry apart the upper portions of the shanks 2 and 5 and permit it to be inserted between the upper inner surfaces of the two said shanks 2 and 5. One end of the worm being attached to the upper portion of the two shanks 2 and 5 the other end portion of the worm is now placed between the two bends of the respective burrs 4 and 7 at a point where the bends 3 and 6 are joined to the lower portions of the shanks 2 and 5, and by upwardly pulling the worm against the opening thus provided by the bends 3 and 6, the worm will act as a wedge to pry apart the lower portions of the respective shanks 2 and 5 to permit the insertion of the worm between the lower inner surfaces of the said two shanks. This will, of course, allow the middle portion of the worm free to move about and become attractive bait. A portion of each end of the worm which extends beyond the point of insertion between the shanks 2 and 5 will also be free to move about. The sought after fish will if approaching the worm from the bottom of the hook, take the hook on his way to the worm, while should the worm be approached from the side of the shanks a pull of the line will cause the hooks to catch the fish.

Some fishing worms are very long and by attaching it in the manner hereinabove explained might permit a good portion of the worm to hang loose. To overcome this, should it be an objection, a worm may be inserted in the device in the manner explained above, any length of worm left over may then be inserted between the upper portion of the shanks 2 and 5 by repeating the original operational procedure, and then if desired repeat the operation between the bends of the fish-hook, and in this way completely use up all of the worm and make a secure attachment of it to the fish-hook. Anyone skilled in the art might readily conceive other ways of introducing bait into the device.

Figure 3:
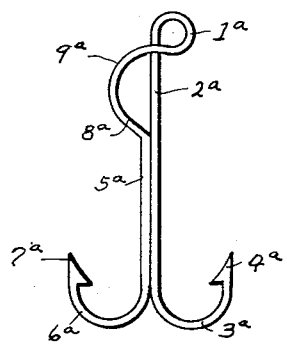
FIGURE 3 is a side elevational view of a modification of the invention contemplated as within the scope of the present disclosure.

In order to simplify the manufacture of the invention by making it possible to produce the device with one piece of material, a modification of the device is shown in FIGURE 3.

This multiple bend fish-hook is in all respects similar to the one previously described, the only difference being the method of connecting the two fish-hooks. This modfication is made of a single piece of spring-like material as previously stated. It is bent between its extremities to form a line-attaching end loop 1a. Extending from one of the extremities of said loop is the shank 2a having a bend 3a and a burr 4a. Extending from the other extremity of said loop 1a approximately horizontally and then curving downwardly to form an irregularly curved opening for the insertion of bait between the upper extremities of the shanks 2a and 5a. Said curved connection is designated by the numeral 9a, the bent end 8a being the same as in the previous embodiment. Formed at the lower extremities of the shanks 2a and 5a are bends 3a and 6a respectively having burrs 4a and 7a respectively. The burr side of the bends of the hooks 3a and 6a are spaced apart to form an opening for the insertion of bait. The operation of this form of the invention is similar to the operation of the preferred embodiment hereinabove explained, the only difference being that the end of the worm is first placed in the opening provided by the curve 9a and bent end 8a.

It is to be understood that the foregoing description and the accompanying drawing is a simple diagrammatic illustration and example, and that changes and alterations in the present disclosure, which will be readily apparent to one skilled in the art, are contemplated as within the spirit of the present invention and the scope of the claims.

What I claim is:

1. In combination, a fish-hook composed of a shank having a line-attaching end loop formed at its upper extremity and positioned to one side of said shank, a bend and a barb formed at its lower extremity; a bait clamping element normally disposed in engagement with the opposite side of said shank, the upper extremity of said bait clamping element having a bend disposed outwardly from said shank thereby forming an inwardly converging bait receiving opening whereby bait material may be inserted in the opening thus provided and then used as a wedge to open the upper end of the clamp, a bend and a barb formed at the lower extremity of said bait clamping element, said last named bend formed to diverge outwardly from the bend of said fish-hook, thus forming an opening between the said two last named bends, whereby bait material may be inserted in the opening thus provided and then used as a wedge to open the lower end of the clamp; and a connection disposed across said shank and attaching the upper extremity of the upper outwardly disposed bend of said clamping element to the line-attaching end loop of said fish-hook.

2. In combination, a fish-hook composed of a shank having a line-attaching end loop formed at its upper extremity and positioned to one side of said shank, a bend and a barb formed at its lower extremity; a bait clamping element normally disposed in engagement with the opposite side of said shank, the upper extremity of said bait clamping element having a bend disposed outwardly from said shank, thereby forming an inwardly converging bait receiving opening whereby bait material may be inserted in the opening thus provided and then used as a wedge to open the upper end of the clamp, a bend and a barb formed at the lower extremity of said bait clamping element, said last named bend formed to diverge outwardly from the bend of said fish-hook, thus forming an opening between the said two last named bends, whereby bait material may be inserted in the opening thus provided and then used as a wedge to open the lower end of the clamping element; and a connection attaching the clamping element to said fish-hook.

References Cited in the file of this patent

UNITED STATES PATENTS

| | | |
|---|---|---|
| 666,309 | Fiege | Jan. 22, 1901 |
| 754,349 | Scott | Mar. 8, 1904 |
| 788,201 | Friend | Apr. 25, 1905 |
| 986,747 | Olson | Mar. 14, 1911 |
| 990,095 | Balcom | Apr. 18, 1911 |
| 1,105,172 | Anschutz | July 28, 1914 |
| 1,750,783 | Pemberton | Mar. 18, 1930 |
| 1,875,182 | Southwell | Aug. 30, 1932 |
| 2,215,612 | Hathaway | Sept. 24, 1940 |
| 2,605,580 | Moore | Aug. 5, 1952 |

FOREIGN PATENTS

| | | |
|---|---|---|
| 96,177 | Germany | Feb. 9, 1898 |